United States Patent

Susuki et al.

[15] 3,687,890
[45] Aug. 29, 1972

[54] THERMOPLASTIC RESINOUS COMPOSITION

[72] Inventors: Rinnosuke Susuki, Tokyo; Hiroshi Hoshi, Chiba; Jiro Saito, Tokyo; Keiichi Murakami, Miyagi; Michio Hirakawa, Chiba, all of Japan

[73] Assignee: Lion Fat & Oil Co., Ltd., Tokyo, Japan

[22] Filed: April 8, 1971

[21] Appl. No.: 132,419

[30] Foreign Application Priority Data

April 25, 1970 Japan ...................... 45/35747

[52] U.S. Cl. ............................. 260/41 R, 106/306
[51] Int. Cl. ............................ C08f 45/04, C08k 1/02
[58] Field of Search ....................... 260/41; 106/306

[56] References Cited

UNITED STATES PATENTS 2,865,779  12/1958  Allen ........................ 106/306
3,409,568  11/1968  Holloday ..................... 260/8

Primary Examiner—Morris Liebman
Assistant Examiner—J. H. Derrington
Attorney—Woodhams, Blanchard and Flynn

[57] ABSTRACT

A thermoplastic resinous composition comprising a thermoplastic resin and mixed therewith at least two fillers selected from the group consisting of calcium sulfite, calcium sulfate and calcium carbonate (excepting a mixture system of calcium sulfite and calcium sulfate), the respective amount of the filler being, as shown in the drawing, within the range surrounded by the point A (100 percent by weight of calcium sulfite, 0 percent by weight of calcium carbonate and 0 percent by weight of calcium sulfate), the point B (20 percent by weight of calcium sulfite and 80 percent by weight of calcium carbonate) and the point C (10 percent by weight of calcium sulfite and 90 percent by weight of calcium sulfate).

2 Claims, 1 Drawing Figure

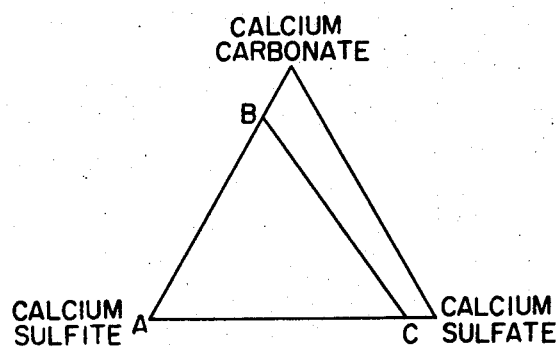

THERMOPLASTIC RESINOUS COMPOSITION

BACKGROUND OF THE INVENTION

1. Field of the Invention

The present invention relates to a thermoplastic resinous composition which shows an excellent performance especially when used as a building and construction material.

2. Description of the Prior Art

It has been a conventional method often adopted in order to improve the heat resistance and mechanical strength of thermoplastic resins by the addition of an inorganic filler to such thermoplastic resins. Many types of fillers such as calcium carbonate, gypsum and the like have hitherto been widely known. These fillers are added to the resin either singly or in combination. There is, however, a limit placed upon a mixing proportion of the filler to the resin, whether used singly or in combination, and when the proportion exceeds 50 percent by weight, the resin loses remarkably its inherent properties such as moldability and workability. Thus, it becomes impossible to mold such resinous material into products of practical use. For this reason, the proportion of fillers to resins is limited approximately to 20–30 percent by weight at most from the viewpoint of safety standards of molding thereby to restrict uses as a resinous composition only to an extender or pigment and to make it impossible to produce a useful material having both improved properties and new uses.

SUMMARY OF THE INVENTION

It is an object of this invention to provide a thermoplastic resinous composition from which the aforementioned faults are eliminated and which has excellent properties to meet various uses, especially in the field of building and construction materials.

The present invention is specifically directed to a method for the preparation of a resinous composition which comprises a thermoplastic resin and a filler added thereto consisting of either a mixture of calcium sulfite and calcium carbonate or a mixture of calcium sulfite, calcium carbonate and gypsum, said mixture each being at a specified proportion.

The inventors have discovered that when mixing calcium sulfite only or a mixture of calcium sulfite and gypsum, as a filler, in large quantity with a thermoplastic resin the resin is improved not only in heat resistance and mechanical strength but also is suitable for use in such as synthetic paper, corrugated board and other kinds of sundry goods without damaging the moldability inherent to the resin. Based on the findings, the inventors conducted a series of studies to know what results would be obtained by modifying the resin with the addition of a filler such as a mixture system consisting of calcium sulfite and calcium carbonate and a mixture system consisting of calcium sulfite, gypsum and calcium carbonate and this made it possible to provide a thermoplastic resinous composition, which has excellent rigidity, tensile strength and nonflammability, by the admixture of the aforementioned filler with a thermoplastic resin.

The filler according to the present invention is used within the range of such a proportion by weight as indicated in the attached drawing which shows a three-system composition, i.e., the point A (100 percent by weight of calcium sulfite, 0 percent by weight of calcium carbonate and 0 percent by weight of gypsum), the point B (20 percent by weight of calcium sulfite and 80 percent by weight of calcium carbonate) and the point C (10 percent by weight of calcium sulfite and 90 percent by weight of gypsum), said range being excluded the mixture system of calcium sulfite and gypsum. As for the fillers mentioned above, such ones that are very fine and of uniform particle diameter must be used. In case of calcium sulfite, the one which is prepared by introducing sulfur dioxide obtained by burning sulphur into a suspension of calcium hydroxide may be recommended. The proportion of a filler to the composition should be preferably kept within the range of 20–80 percent by weight to achieve the best result.

Suitable thermoplastic resins are, for example, polyethylene, polypropylene, polyvinyl chloride and blends thereof.

In practicing the present invention, it may be allowed to add ordinary additives such as plasticizer, antioxidant, colorant, thickening agent, and the like to the resin.

Furthermore, the resinous composition of the present invention can be molded by means of an ordinary method such as injection molding, blow molding, etc.

BRIEF DESCRIPTION OF THE DRAWING

The attached drawing indicates a formational figure of the three component system to show the range of the proportion by weight of a filler to be used in a resinous composition of the present invention.

DESCRIPTION OF THE PREFERRED EMBODIMENTS

EXAMPLE 1

65 percent by weight of fillers which respectively consist of the components mentioned in table 1 was added to 35 percent by weight of polyethylene from medium or low pressure polymerization process. The respective resinous compositions were calendered and were then made into sheets having a thickness of 4 mm. The physical properties of thus prepared sheets were as per table 2 and these figures showed that the mechanical strength and nonflammability were much improved when compared with medium or low pressure process polyethylene sheets prepared according to the same method as applied to the aforementioned sheet used in this example except for an admixture of the filler.

TABLE 1

| Filler | A | B | (% by weight) C |
|---|---|---|---|
| Calcium sulfite | 20 | 60 | 20 |
| Calcium sulfate | 60 | 20 | 20 |
| Calcium carbonate | 20 | 20 | 60 |

TABLE 2

| Property | A | B | C | Medium or low pressure process polyethylene |
|---|---|---|---|---|
| Maximum bending stress (kg/cm$^2$) JIS K 6911 | 680 | 960 | 820 | 510 |

| | | | | |
|---|---|---|---|---|
| Tensile strength (kg/cm²) | 310 | 320 | 400 | 410 |
| Nonflammability (5 step evaluation) | 4 | 3 | 3 | 1 |

EXAMPLE 2

Polyethylene sheets were made according to example 1 wherein said resinous compositions were prepared by mixing 60 percent by weight of the filler with 40 percent by weight of high pressure process polyethylene (a ratio by weight of calcium sulfite and calcium carbonate was changed as shown in table 3).

TABLE 3

| Filler | D | E |
|---|---|---|
| Calcium sulfite | 70 | 30 |
| Calcium carbonate | 30 | 70 |

Physical properties of the respective sheets having a thickness of 4 mm conditioned with the use of fillers whose composing ratio was according to D and E are shown in table 4.

TABLE 4

| Property | D | E | High pressure process polyethylene |
|---|---|---|---|
| Bending stress (kg/cm²) JIS K 6911 | 376 | 413 | 281 |
| Tensile strength (kg/cm²) JIS K 6911 | 186 | 172 | 308 |
| Nonflammability (5 step evaluation) | 3 | 3 | 1 |

Required products were made from the resinous compositions (as indicated in table 6) which had been prepared by mixing the prescribed fillers (as per table 5) with polyethylene from medium or low pressure polymerization. The properties obtained from the respective products were as per table 6.

TABLE 5

Fillers

| Mixed Filler | Calcium Sulfite | Calcium Sulfate | Calcium Carbonate |
|---|---|---|---|
| | (% by weight) | | |
| F | 20 | 0 | 80 |
| G | 18 | 41 | 41 |
| H | 12 | 86 | 2 |
| I | 44 | 44 | 2 |
| J | 98 | 2 | 0 |
| K | 40 | 30 | 30 |
| F' | 14 | 6 | 80 |
| G' | 5 | 50 | 45 |
| H' | 5 | 90 | 5 |

TABLE 6

| Property | | | | | |
|---|---|---|---|---|---|
| Polyethylene (% by weight) | 20 | 30 | 50 | 80 | |
| Mixed filler (% by weight) | 80 | 70 | 50 | 20 | |
| Mixed Filler | F F' J | I | G | G' H H' | |
| Sample | Plate, 5 mm thick | | | Sheet, 0.2 mm thick (calendered) | |

| | | | | | | | |
|---|---|---|---|---|---|---|---|
| Maximum bending Tensile Strength (kg/cm²) | 280 110 | 110 64 | 320 140 | L 430 C 250 L 11 | L 650 C 380 L 50 | L 300 C 270 L 280 | L 610 C 570 L 600 | L 310 C 170 L 680 |
| Elongation (%) | In- In- | | | C 42 | C 342 | — | C- G- 160 230 | C 210 |
| Nonflammability (5 step evaluation) | 4.5 | 4.5 | 4.5 | — | — | — | — | — |
| Remarks | present Invention | control | present Invention | present Invention | present Invention | control | present Invention | control |

Note: L — lengthwise direction
C — Crosswise direction

EXAMPLE 4

Polypropylene bottles as specified by JIS Z-1703 were made by means of blow molding from the resinous composition comprising 60 percent by weight of polypropylene and 40 percent by weight of the mixed filler K mentioned in example 3. Similar polypropylene bottles were made using the mixed filler G' as a control in place of the mixed filler K for the sake of comparison.

The tests were conducted on these polypropylene bottles to determine their resistance to compression with the results as shown in table 7.

TABLE 7

| Bottle | Maximum Resistance to Compression (kg/cm²) | Remarks |
|---|---|---|
| Bottles with mixed filler K | 3.7 | Present Invention |
| bottles with mixed filler G' | 1.2 | Control |

EXAMPLE 5

Polyvinyl chloride plates of 10 × 30 × 200 mm were made by means of injection molding from the resinous composition consisting of 50 percent by weight of commercially available polyvinyl chloride resin and 50 percent by weight of the mixed filler K mentioned in example 3. Another type of polyvinyl chloride plates were also made in the same way with the employment of the mixed filler G' as a control in place of the mixed filler K. The physical properties of these plates were as shown in table 8.

TABLE 8

| Plate | Physical Property | | Remarks |
|---|---|---|---|
| | Maximum Bending Stress (kg/cm²) | Bending Rigidity (kg/cm²) | |
| Plate with the mixed filler K | 480 | 1,400 | Present invention |
| Plate with the mixed filler G' | 180 | 7,700 | Control |

What we claim is:

1. A thermoplastic resinous composition comprising a thermoplastic resin and mixed therewith at least two fillers, wherein the proportion of the fillers in the composition is 20–80 percent by weight, which are selected from the group consisting of calcium sulfite, calcium sulfate and calcium carbonate, excepting a mixture of calcium sulfite and calcium sulfate, the amount of the filler being, as shown in the drawing, within the range bounded by the point A; 100 percent by weight of calcium sulfite, 0 percent by weight of calcium carbonate and 0 percent by weight of calcium sulfate, the point B; 20 percent by weight of calcium sulfite and 80 percent by weight of calcium carbonate and the point C; 10 percent by weight of calcium sulfite and 90 percent by weight of calcium sulfate.

2. A composition according to claim 1 wherein said thermoplastic resin is selected from the group consisting of polyethylene, polypropylene, polyvinyl chloride and the blends thereof.

* * * * *